Feb. 27, 1968 B. H. DANN 3,371,288
PERIOD MODULATION MULTIVIBRATOR CIRCUIT
Filed July 19, 1965
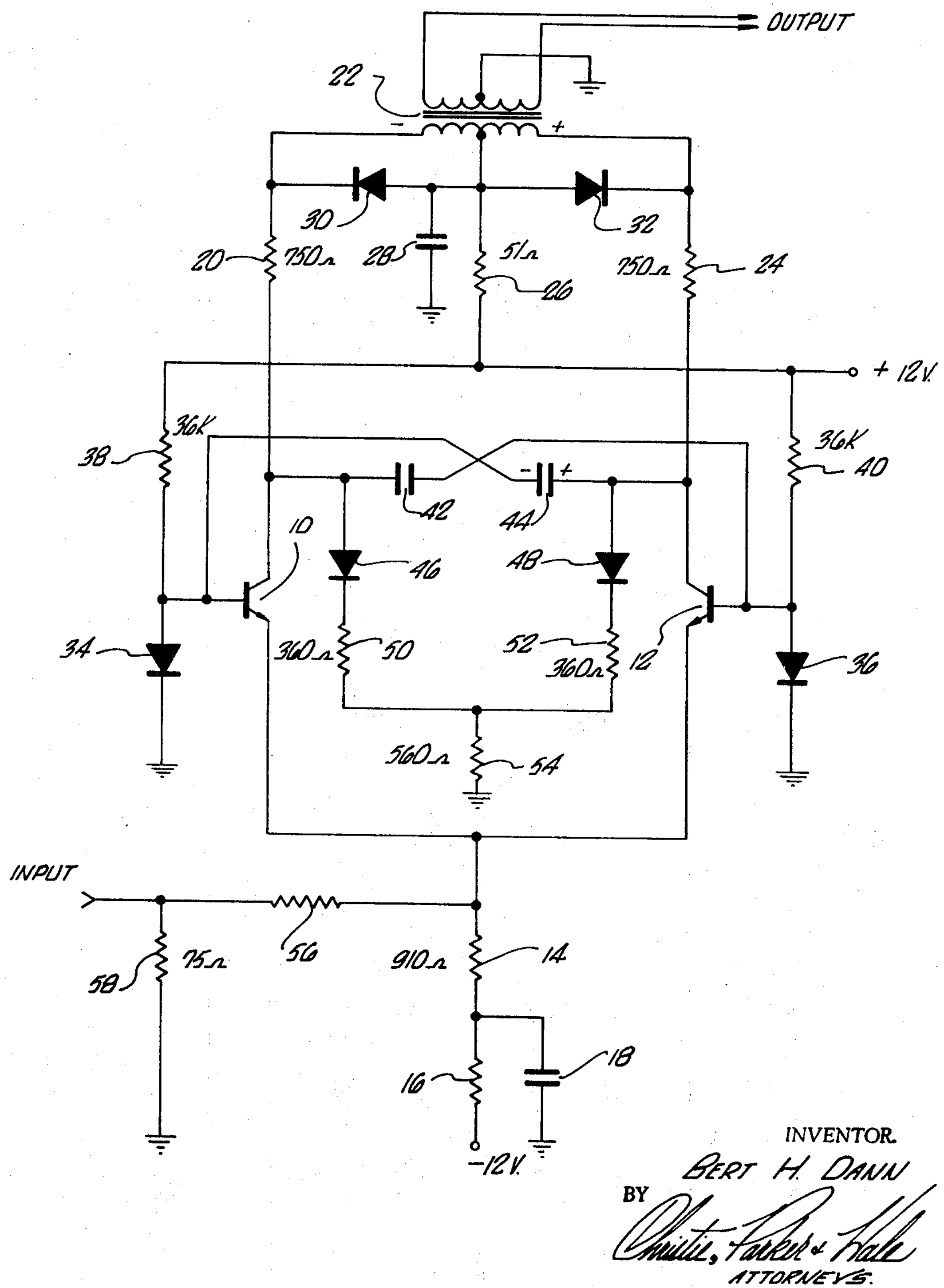
INVENTOR.
BERT H. DANN
BY
Christie, Parker & Hale
ATTORNEYS.

United States Patent Office 3,371,288

Patented Feb. 27, 1968

3,371,288

PERIOD MODULATION MULTIVIBRATOR CIRCUIT

Bert H. Dann, Altadena, Calif., assignor to Bell & Howell Company, Chicago, Ill., a corporation of Illinois Filed July 19, 1965, Ser. No. 473,100
5 Claims. (Cl. 332—14)

ABSTRACT OF THE DISCLOSURE

There is described a modulation circuit which generates a periodic or alternating output signal in which the duration of each semi-period is directly proportional to the amplitude of a modulating input signal at the end of the semi-period, and in which the duration of each semi-period is independent of the preceding semi-period.

This invention relates to modulation circuits and, more particularly, is concerned with an improved circuit for generating a carrier signal in which the half period is controlled in direct proportion to the instantaneous amplitude of a modulating input signal.

In copending application Ser. No. 231,916, filed Oct. 22, 1962, in the name of Wayne K. Hodder and assigned to the same assignee as the present invention, there is described a novel modulation technique which may be referred to as period modulation. Period modulation, as described in the above-identified application, is characterized by the fact that the half cycle time period of a carrier signal changes in direct proportion to the instantaneous amplitude of an input modulating signal. Thus period modulation differs from frequency modulation in that in frequency modulation it is the frequency which varies linearly with the amplitude of the input signal. In the above-identified copending application, there is described a modulation circuit for achieving period modulation. The present invention is directed to an improved circuit for achieving period modulation requiring only two transistors and six low cost diodes.

In brief, the circuit of the present invention provides an arrangement in which one transistor, which can be designated the active transistor, acts as a common-base amplifier while the other (inactive) transistor is cut off. The two transistors interchange roles at each successive zero-crossing of the output.

During a given semi-period of the output wave, a coupling capacitor at the collector of the inactive transistor is charged to a fixed potential, this being done by low-impedance circuit elements in a time which is short compared to the minimum semi-period. During this same semi-period, a similar capacitor at the collector of the active transistor is linearly discharged through a relatively large resistance and relatively large supply potential, while simultaneously the reference potential to which it is returned is varied by the video signal present at the collector of the active transistor. An essential point is that the amplitude of the video signal is sufficiently small in comparison to the supply voltage which causes the linear capacitor discharge that the rate of this discharge is unaffected by the video signal.

At the instant in which the linearly-changing voltage across the active coupling capacitor and the reference potential to which it is returned (which is being varied by the video signal as outlined above) have a sum such that the base-emitter potential of the inactive transistor corresponds to that required for the onset of conduction, regenerative switching will occur and the transistors will interchange roles.

Since both the initial charge and the rate of discharge of the active capacitor are unaffected by the amplitude of the input modulating signal, true period modulation is obtained.

For a more complete understanding of the invention, reference should be made to the accompanying drawing wherein the single figure is a schematic circuit diagram of the period modulation circuit.

Referring to the single figure in detail, the numerals 10 and 12 indicate NPN-junction transistors, having their emitter electrodes connected together to the negative side of a potential source (not shown) through a pair of series connected resistors 14 and 16. The series junction point between the resistors 14 and 16 is connected to ground through a bypass condenser 18. The collector of the transistor 10 is connected through a load resistor 20 to one side of the primary of an output transformer 22. The collector of the transistor 12 is similarly connected through a load resistor 24 to the other end of the primary of the output transformer 22. A double ended output is derived from the secondary of the output transformer 22.

The center tap of the primary of the output transformer 22 is connected through a common decoupling resistor 26 to the positive side of the potential source. A bypass condenser 28 connects the center tap of the primary of the output transformer 22 to ground. A pair of diodes 30 and 32 are connected across the two halves of the primary winding of the output transformer 22 to limit the peak voltage drops to values equal to the normal forward drops of the diodes. Diodes 30 and 32 conduct alternately on alternate half cycles of the AC output signal, and provide a substantially constant output amplitude in spite of variations in the collector current of the conducting transistor produced by the input modulating signal.

The base electrodes of the transistors 10 and 12 are respectively clamped to ground potential by diodes 34 and 36. The base electrodes are also tied to the positive side of the potential source through relatively large resistors 38 and 40. The two transistors are coupled together by a capacitor 42 which couples the collector of the transistor 10 to the base of the transistor 12 and a capacitor 44 which couples the collector of the transistor 12 to the base of the transistor 10. A clamping circuit is provided for the collectors of the transistors 10 and 12 by means of diodes 46 and 48 through series resistors 50 and 52 and the common resistor 54.

The modulating input signal is applied to the common connection between the emitters of the transistors 10 and 12 through a relatively large series resistor 56. The input signal voltage across input resistor 58 thus appears as a signal current at the emitter of the conducting transistor.

In operation, a modulating signal, such as an audio or video signal, is applied to the input across the resistor 58. Assuming initially that the input signal is zero, the circuit operates as a multivibrator type oscillator in which the transistors 10 and 12 are conductive on alternate half cycles of operation of the oscillator. The transistors, when conducting, draw collector current determined by the value of the resistors 14 and 16. With the input signal at zero, the values of the circuit components are selected such that the collector of the conducting transistor is approximately +3 volts.

Consider the circuit operating in the half cycle in which the transistor 10 is conducting and the transistor 12 is cut off. Since the current through the collector load resistor 20 is in excess of the current through the collector load resistor 24 when the transistor 10 is conducting and the transistor 12 is turned off, the diode 30 is forward biased and the diode 32 is back biased. Since the two halves of the primary of the transformer 22 are closely coupled and the center tap is bypassed to ground through a low reactance capacitor 28, the impedance at the transformer connection to resistor 24 and diode 32 will be approximately that of forward biased diode 30 and hence quite low. The resistors 24, 52 and 54 and the diode 48 form a low impedance voltage divider across the positive supply voltage. The capacitor 44 is very rapidly charged to approximately +6 volts based on the circuit values shown in the preferred embodiment. It will be noted that the capacitor 44 is clamped to ground potential at one end by the clamping diode 34. There is sufficient voltage drop across the resistor 54 to back bias the clamping diode 46 so that the voltage divider circuit and the charging of the capacitor 44 has no effect on the load current of the conducting transistor 10.

Since the capacitor 42 has been similarly charged up to six volts during the previous half cycle, when the transistor 10 becomes conductive, the six volt drop across the capacitor 42 initially lowers the potential on the base of the transistor 12 to −3 volts. The capacitor 42 then is discharged through the resistor 40 until the base potential of the transistor 12 rises to the point where the transistor 12 becomes conductive. When the transistor 12 becomes conductive, of course the collector potential drops and the transistor 10 is then cut off by the voltage drop appearing across the capacitor 44. Thus oscillation is sustained in which the transistors 10 and 12 are alternately conductive.

If now an input potential is developed across the input resistor 58, assuming again that the transistor 10 is conductive and the transistor 12 is cut off, transistor 10 acts as a common base video amplifier so that the collector potential is varied in direct proportion to change in the input signal from its nominal value. It will be seen that the time at which the base of the transistor 12 reaches zero potential and terminates the half cycle operation in which the transistor 12 is cut off is a function of both the change in voltage across the capacitor 42 as it discharges and the level of the input signal as it affects the voltage at the collector of the transistor 10. It will be noted that since the nominal change in the potential at the base of the transistor 12 when it is cut off is 3 volts, a change of only ±0.6 volt at the collector of the transistor 10 gives ±20% variation in the period of the half cycle. This change in collector voltage is so small compared to the supply voltage to which the capacitor 42 is charging that the effect on the rate of change of charge is negligible. Thus the time duration of the half cycle is directly proportional to the instantaneous amplitude of the input signal, as is required for the type of modulation described in the above-identified copending application.

It should be noted that the above-described circuit is self-compensating with temperature changes if the transistors and diodes are of similar types, such as all silicon. For example, if the transistor 10 is conducting, any change in the base-to-emitter voltage of the transistor 10 with temperature is matched by a corresponding change across the conducting diode 34. As a result, the emitter current of the transistor 10 is held substantially constant with temperature. Therefore the circuit is useful as a stable oscillator as well as a modulator.

What is claimed is:

1. A modulator comprising first and second transistors, each transistor including an emitter, a collector and a base, means including first and second load resistors respectively connecting the collectors to one side of a potential source, means for varying the total current at the emitters in response to an input signal, a first capacitor coupling the base of the first transistor to the collector of the second transistor, a second capacitor coupling the base of the second transistor to the collector of the first transistor, a first diode connecting the base of the first transistor to a fixed reference potential, a second diode connecting the base of the second transistor to said fixed reference potential, a third diode and series resistor connecting the collector of the first transistor to said reference potential, a fourth diode and series resistor connecting the collector of the second transistor to said reference potential, and biasing means connected to the base of both transistors tending to bias the transistors conductive and tending to forward bias the first and second diodes, the biasing means including resistors connecting the respective base electrodes to a potential source, the resistors being large relative to the load resistors.

2. Apparatus as defined in claim 1 wherein the third and fourth diodes are connected to the reference potential through a common resistor.

3. Apparatus as defined in claim 1 further including an output transformer having a center-tapped primary with the two halves of the primary connected in series with the respective load resistors and the one side of the potential source.

4. Apparatus as defined in claim 3 further including fifth and sixth diodes respectively connected across the two halves of the primary of the output transformer.

5. A modulator for generating a periodic output signal in which the time duration of each semi-period is proportional to the amplitude of a modulating input signal at the end of the semi-period and the time duration is independent of the duration of the preceding semi-period, said modulator comprising first and second transistors, each transistor having emitter, base, and collector electrodes, means including first and second load resistors respectively connecting the collectors to a potential source, means for varying the emitter current in each of the transistors when the transistors are conducting, said means varying the current in direct proportion to the amplitude of the input signal, first and second capacitors respectively connecting the base of one transistor to the collector of the other transistor, biasing resistors respectively connecting the bases to a potential source for normally biasing the transistors to a conductive state, unidirectional conductive means for clamping the bases and associated ends of the capacitors to a reference potential, means including a unidirectional conductive device connected to each collector for clamping the respective collectors and associated ends of the capacitors to a predetermined potential intermediate the potential to which the load resistors are connected and the reference potential to which the bases are clamped, whereby both ends of each capacitor are clamped in order to fix the voltage to which the capacitors are charged.

References Cited

UNITED STATES PATENTS

| | | | |
|---|---|---|---|
| 2,297,926 | 10/1942 | Usselman | 331—144 |
| 2,572,016 | 10/1951 | Elbourn | 332—14 |
| 2,762,917 | 9/1956 | Sharin et al. | 331—144 |
| 2,900,606 | 8/1959 | Faulkner | 331—113 |

JOHN KOMINSKI, *Primary Examiner.*